Nov. 6, 1934.                G. H. LELAND                 1,979,480
           CIRCUIT CONTROLLING MEANS FOR AN INDUCTION MOTOR
                    Filed Dec. 9, 1933        2 Sheets-Sheet 1
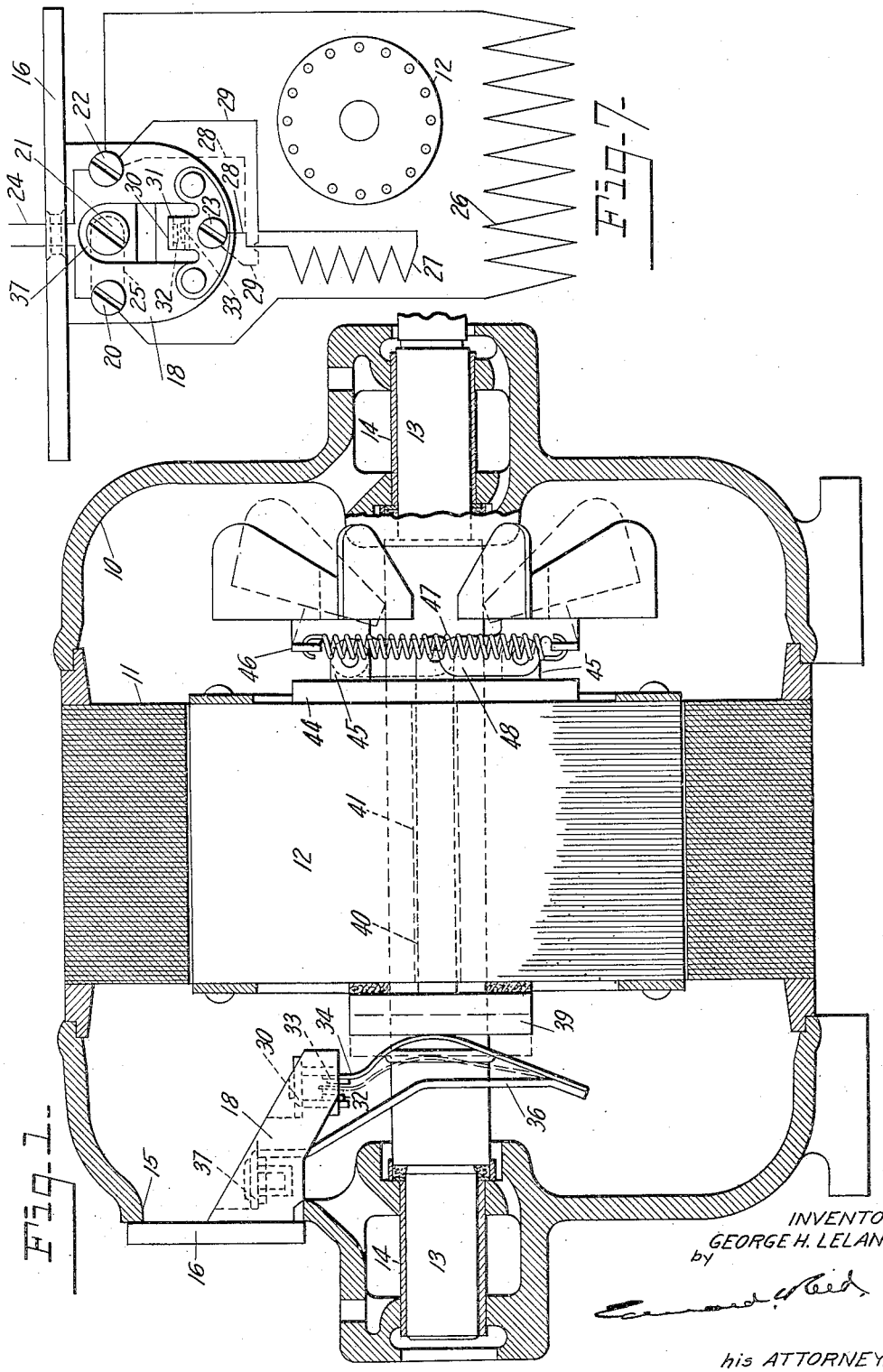
INVENTOR.
GEORGE H. LELAND.
by
his ATTORNEY.

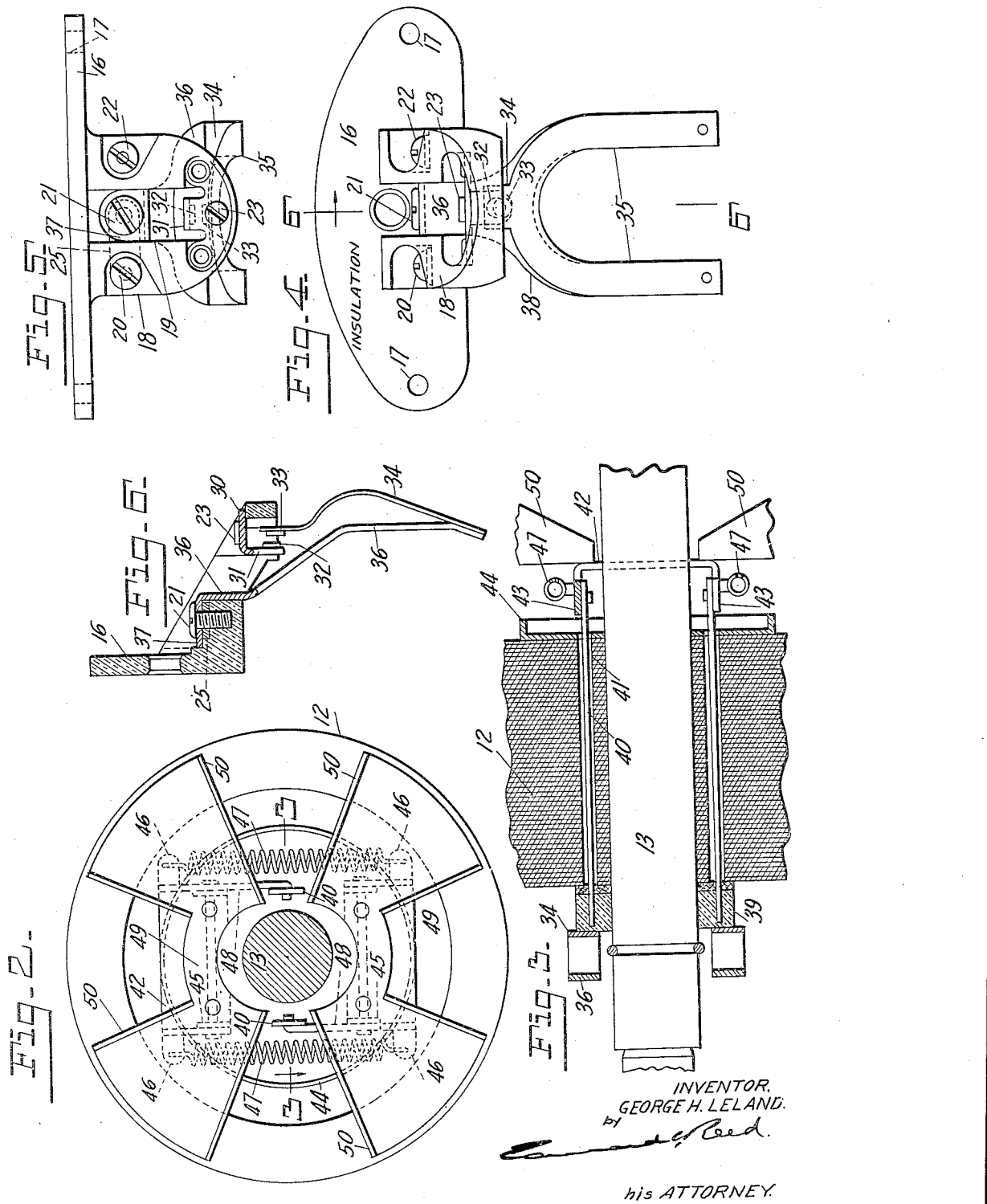

Patented Nov. 6, 1934

1,979,480

UNITED STATES PATENT OFFICE 1,979,480

CIRCUIT CONTROLLING MEANS FOR AN INDUCTION MOTOR

George H. Leland, Dayton, Ohio, assignor, of one-half to The Leland Electric Company, Dayton, Ohio, a corporation of Ohio Application December 9, 1933, Serial No. 701,627

18 Claims. (Cl. 172—279)

This invention relates to circuit controlling means for a single phase induction motor or the like and is in part a continuation of the application filed by me October 21, 1932, Serial No. 638,873. An induction motor is usually provided with means for changing the motor circuits to reverse the direction of rotation of the motor. When the motor is provided with a closed casing or frame the circuit connections must be mounted within this frame and are usually very inaccessible and much time and labor is required to change the circuits.

One object of the present invention is to provide a motor of such a character that the circuit connections, or terminal block, will be readily accessible.

A further object of the invention is to provide such a motor with a starting switch so mounted within the casing that access may be readily had thereto for inspecting or repairing the switch members.

A further object of the invention is to provide a motor in which the starting switch will be combined with a removable terminal block.

A further object of the invention is to provide such a motor with an improved starting switch which will be simple in construction and highly efficient in operation.

A further object of the invention is to provide such a motor with improved means for automatically controlling the starting switch and for circulating air through the motor frame.

Other objects of the invention will appear as the mechanism is described in detail.

In the accompanying drawings Fig. 1 is a longitudinal sectional view taken through a motor embodying my invention; Fig. 2 is an end elevation of the centrifugal device; Fig. 3 is a longitudinal section taken on the line 3—3 of Fig. 2; Fig. 4 is an elevation of the combined terminal block and starting switch; Fig. 5 is a plan view of the terminal block and starting switch; Fig. 6 is a sectional view taken on the line 6—6 of Fig. 4; and Fig. 7 is a circuit diagram.

In these drawings I have illustrated one embodiment of my invention and have shown the same as applied to an induction motor of a well known type. It will be understood, however, that this particular embodiment has been chosen for the purpose of illustration only, and that the invention may take various forms and may be embodied in motors of various kinds.

As here shown the motor comprises a closed casing or frame 10 which carries the field coils 11. Mounted within this frame is a rotor 12, the shaft 13 of which is journaled in bearings 14 at the respective ends of the frame. The frame is provided at one end with an opening 15 which, in the present instance, is formed in the end wall of the frame. This opening is normally closed by a plate or closure 16, preferably of insulating material, which is detachably secured to the frame, it being in the present instance provided with holes 17 to receive the attaching devices, such as screws. Rigidly secured to the closure 16, and preferably formed integral therewith, is a terminal block 18 which is supported within the frame when the closure is secured to the latter and which may be removed through the opening 15 when the closure is removed. This terminal block is provided with a plurality of terminals with which the motor circuits may be interchangeably connected, in order to control the direction of rotation of the rotor. As here shown, the terminal block is provided with an opening 19 and has on that side of the opening adjacent to the closure 16 three terminals 20, 21 and 22 and has on the opposite side of the opening a single terminal 23. The terminals 20 and 22 are connected with the respective sides of the main line 24 and the terminal 20 is connected with the terminal 21 in any suitable manner, as by a conductor 25 mounted in the terminal block. The motor winding 26 has its ends connected respectively with the terminals 20 and 22, and the motor winding 27 has one end, 28, connected with the terminal 23 and has its other end, 29, connected with the terminal 22. To reverse the rotation of the rotor the connections of the winding 27 are reversed, that is, the end 28 thereof is connected with the terminal 22 and the end 29 is connected with the terminal 23. It will be apparent that when it is desired to change the connections of the windings with the terminals it is only necessary to remove the closure 16 and withdraw the terminal block, thereby rendering the terminals readily accessible.

An induction motor requires a larger current for starting than for operating and it is customary to provide the same with an automatically controlled switch, which, when the motor is idle or running at low speed, will close the starting circuit and, when the motor has attained normal speed, will open the starting switch. In the present construction this starting switch is carried by the terminal block so that it will be removable through the opening 15 with the terminal block to permit access to be had to the switch members. As here illustrated the terminal 23 is carried by a bracket 30 secured to the terminal block and having an angular portion 31 extending through the opening 19 and spaced from that edge of the opening which is adjacent to the rotor, and the stationary contact of the switch is carried by this part 31 of the bracket and, as shown at 32, is arranged on that side of the bracket adjacent to the rotor. The movable member of the switch comprises a contact 33 carried by one end of a resilient conducting member 34 which extends into the opening 19 of the terminal block between the part 31 of the bracket and the inner edge of the opening. The other end portion of this resilient member is bifurcated as shown at 35, and is carried by a rigid conducting member 36. This rigid conducting member has one end extending through the opening 19 and connected with the terminal 21, as shown at 37, and the other end portion of the rigid member 36 is bifurcated, as shown at 38. The bifurcated portions of the members 33 and 36 straddle the rotor shaft 13 and the corresponding arms of the two members are connected one to the other on that side of the shaft opposite the terminal block. Preferably the arms of the bifurcated portion of the resilient member 34 are bowed or curved toward the rotor. It will be obvious that this switch can be withdrawn from the casing along with the terminal block when the latter is removed from the casing.

Suitable speed controlled means are provided for actuating the switch and this means preferably comprises an actuating member 39 in the form of a collar slidably mounted on the shaft 13 between the switch and the rotor and arranged to engage the resilient switch member 34, this collar being preferably of insulating material and its movement in one direction being limited by its contact with the rotor. Connected with and preferably rigidly secured to the actuating collar 39 are connecting members or bars 40 which extend through and are slidable in longitudinal openings 41 in the rotor, which openings are of sufficient width to permit a slight traverse movement of the bars. Mounted at the opposite end of the rotor is a centrifugal device comprising two weights pivotally mounted on the rotor, connected with the bars 40 and held normally in their innermost positions by springs. In the construction here shown these weights are formed of sheet metal and each comprises a member 42 extending transversely to the shaft 13 and having its end portions 43 bent substantially at right angles thereto and extending toward the rotor. A supporting plate 44 secured to the end of the rotor is provided with pivot lugs 45 to which the end members 43 are pivotally connected on axes spaced some distance from the shaft. One end member of each weight has a part or arm 48 extending inwardly from the axis of the weight to a point near the axial plane of the shaft and constituting a crank arm which is pivotally connected with one of the bars 40, these bars thus serving to connect the centrifugal device with the switch actuating device. Each end member 43 has a laterally extending lug 46 and the corresponding lugs of the two weights are connected one to the other by coiled springs 47. These lugs are spaced outwardly beyond the pivotal axes of the respective weights and are so arranged that when the weights are in their outermost positions the lugs, or points of connection with the springs, will be arranged in a line parallel with and close to a line extending through the pivotal axis of the two weights. When the weights are in their innermost positions the points of connection with the springs will be spaced outwardly some distance from the line extending through the axes of the weights. The first outward movement of the weights will be strongly resisted by the springs because the points of connection of the springs with the weights are moving in arcs which diverge rather widely from the shaft, but as the weights approach the outer limits of their movement the springs will offer a decreasing amount of resistance to such movement because they are approaching the center line and are traveling at a very slight inclination to the shaft. Consequently the latter part of the outward movement of the weights will be accomplished more quickly than the initial portion of those movements. Upon the decrease of rotor speed the springs will move the weights inwardly and as the points of connection of the springs with the weights move away from the line of the axis of the weights the action of the springs thereon will be increased and their movement expedited, thus causing the switch actuating member to be quickly shifted to its final position.

Inasmuch as the weights are mounted on axes spaced substantial distances from the axis of the shaft and the arms 48 thereof extend inwardly to points close to the transverse axial plane of the shaft it will be obvious that the inner ends of the arms will move through slight arcs and consequently will impart but slight transverse movement to the ends of the bars 40 which are pivotally connected thereto. The switch actuating member or collar 39 is rotatably mounted on the shaft and is rigidly connected with the bars 40 and any transverse movement imparted to the bars by the weights will cause both bars to move in the same direction and this movement will be transmitted to the collar, which will rotate on the shaft. Consequently no transverse strain or twisting action will be imposed upon the bars and there will be no tendency of the pivotal connections of the bars with the weights to bind.

In order to maintain a circulation of the air within the motor frame the centrifugal weights are preferably provided with fan blades. In the present construction a plate 49 is rigidly secured to the transverse member of each weight and has portions thereof extending lengthwise of the rotor shaft to form fan blades, as shown at 50. When the weights are rotating with the rotor these fan blades will maintain an effective circulation of the air.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a motor comprising a frame, and a rotor having a shaft journaled in said frame, a terminal block removably mounted in said frame, a switch carried by said terminal block, a switch actuating device slidably mounted on said shaft, and a centrifugal device mounted for rotation with said rotor and operatively connected with said switch actuating device.

2. In a motor comprising a frame, and a rotor having a shaft journaled in said frame, a terminal block removably mounted in said frame and having a plurality of terminals, a switch comprising a fixed contact mounted on said terminal block and connected with one of said terminals, a resilient conducting member supported by said terminal block and connected with another of said terminals, a contact mounted on said resilient member for movement therewith into and out of engagement with said fixed contact, a switch actuating device slidably mounted on said shaft in operative relation to and disconnected from said resilient member, and a centrifugal device mounted for rotation with said rotor and operatively connected with said switch actuating device.

3. A motor comprising a frame, and a rotor having a shaft journaled in said frame, a terminal block removably mounted in said frame and having a plurality of terminals, a switch comprising a fixed contact mounted on said terminal block and connected with one of said terminals, a rigid conducting member mounted on said terminal block, connected with another of said terminals and extending across said shaft, a resilient conducting member supported by and electrically connected with said member and extending across said shaft, a contact carried by said resilient member and movable therewith into and out of engagement with said fixed contact, an actuating device slidably mounted on said shaft and arranged to operatively engage said resilient member, and a centrifugal device mounted for rotation with said rotor and operatively connected with said switch actuating device.

4. A motor comprising a frame, and a rotor having a shaft journaled in said frame, a terminal block removably mounted in said frame and having a plurality of terminals, a switch comprising a fixed contact mounted on said terminal block and connected with one of said terminals, a rigid conducting member mounted on said terminal block, connected with another of said terminals and having a bifurcated portion straddling said shaft, a resilient conducting member having a bifurcated portion straddling said shaft and connected with said rigid member on that side of said shaft opposite said terminal block, a contact carried by said resilient member and movable therewith into and out of engagement with said fixed contact, an actuating device slidably mounted on said shaft and arranged to operatively engage said resilient member, and a centrifugal device mounted for rotation with said rotor and operatively connected with said switch actuating device.

5. In a motor comprising a frame having an opening therein, and a rotor having a shaft journaled in said frame, a closure for said opening, a terminal block supported by said closure within said frame and removable through said opening, said terminal block having a plurality of terminals with which the motor windings may be interchangeably connected, a switch carried by said terminal block and removable from said frame therewith, an actuating device for said switch, and means controlled by the speed of said rotor for operating said switch actuating device.

6. In a motor comprising a frame having an opening therein, and a rotor having a shaft journaled in said frame, a closure for said opening, a terminal block supported within said frame and removable through said opening, said terminal block having a plurality of terminals with which the motor windings may be interchangeably connected, a switch comprising a stationary contact connected with one of said terminals, and a movable contact connected with another of said terminals, an actuating device mounted at one end of said rotor in operative relation to said movable contact, a centrifugal device mounted at the other end of said rotor for rotation therewith, and means for operatively connecting said centrifugal device with said actuating device.

7. In a motor comprising a frame having an opening therein, and a rotor having a shaft journaled in said frame, a closure for said opening, a terminal block supported by said closure within said frame and removable through said opening, said terminal block having a plurality of terminals with which the motor windings may be interchangeably connected, a switch comprising a stationary contact connected with one of said terminals, a resilient conducting member connected with another of said terminals and having a bifurcated portion straddling said shaft, a contact supported by said resilient member in cooperative relation to said stationary contact, an actuating member slidably mounted on said shaft at one end of said rotor in operative relation to said resilient member, a centrifugal device mounted on the other end of said rotor, and means extending through said rotor for connecting said centrifugal device with said actuating device.

8. In a motor comprising a frame having an opening therein, and a rotor having a shaft journaled in said frame, a closure for said opening, a terminal block supported by said closure within said frame and removable through said opening, said terminal block having a plurality of terminals with which the motor windings may be interchangeably connected, a switch comprising a stationary contact connected with one of said terminals, a movable contact connected with another of said terminals, an actuating device mounted at one end of said rotor in operative relation to said movable contact, centrifugally operated weights arranged on opposite sides of said shaft at the other end of said rotor and each comprising a member transverse to said shaft, means for pivotally mounting said transverse members on said rotor, springs acting on said weights to move the same inwardly, means for connecting said weights with said actuating device, and plates secured to the transverse members of said weights and each having a plurality of parts extending lengthwise of said shaft to form fan blades.

9. In a motor comprising a frame, and a rotor having a shaft journaled in said frame, a supporting structure mounted in said frame, a stationary contact carried by said structure, a rigid conducting member supported by said structure, a resilient conducting member carried by said rigid member, said members having bifurcated portions straddling said shaft and connected one with the other on that side of said shaft opposite said supporting structure, a contact carried by said resilient member in cooperative relation to said stationary contact, an actuating device slidably mounted on said shaft in operative relation to said resilient member, a centrifugal device mounted on said rotor, and means for operatively connecting said centrifugal device with said actuating device.

10. In a motor comprising a frame having an opening therein, and a rotor having a shaft journaled in said frame, a closure for said opening, a terminal block supported within said frame and removable through said opening, said terminal block having a plurality of terminals with which the motor windings may be interchangeably connected, a switch carried by said terminal block and removable from said frame therewith, an actuating device for said switch, and means controlled by the speed of said rotor for operating said switch actuating device.

11. In a motor comprising a frame having an opening therein, and a rotor having a shaft journaled in said frame, a closure for said opening, a terminal block supported by said closure within said frame, removable through said opening and having a part extending inwardly to a point adjacent to said shaft, said terminal block having a plurality of terminals with which the motor windings may be interchangeably connected, a switch carried by said terminal block and removable therewith, and means for actuating said switch.

12. In a motor comprising a frame having an opening therein, and a rotor having a shaft journaled in said frame, a terminal block supported within said frame adjacent to said opening and having a plurality of terminals with which said motor windings may be interchangeably connected, a switch carried by said terminal block, an actuating device for said switch mounted on said shaft, and means controlled in accordance with the speed of said rotor to cause said actuating device to actuate said switch.

13. In a motor comprising a frame having an opening therein, and a rotor having a shaft journaled in said frame, a supporting member removably supported within said frame, a switch carried by said supporting member, said switch and said supporting member being removable as a unit through said opening, an actuating device for said switch, and means controlled in accordance with the speed of said rotor to cause said device to actuate said switch.

14. In a motor comprising a frame having an opening therein, and a rotor having a shaft journaled in said frame, a supporting member removably supported within said frame, a switch carried by said supporting member, said switch and said supporting member being removable as a unit through said opening, an actuating device for said switch, centrifugal weights mounted at that end of said rotor opposite said switch for rotation therewith and on axes arranged on opposite sides of said shaft, said weights having parts extending inwardly from said axes, springs extending across said shaft and connected with said weights on the outer side of said axis and at points adjacent to a plane extending through said axes, and members extending through the body of said rotor and connected with the inwardly extending parts of said weights and with said switch actuating device.

15. In a motor comprising a rotor having a shaft, a switch mounted near one end of said rotor, and an actuating device rotatably and slidably mounted on said shaft in operative relation to said switch; centrifugal weights arranged near the other end of said rotor on opposite sides of said shaft, means for pivotally connecting said weights with said rotor on axes arranged between the respective weights and the body of said rotor, each weight having a part extending inwardly from its axis to a point adjacent to said shaft, said inwardly extending parts being arranged on opposite sides of said shaft, longitudinally movable bars rigidly connected with said switch actuating device, extending through the body of said rotor and pivotally connected with the respective inwardly extending parts of said weights, and a spring connected with the respective weights at points spaced outwardly from their axes and arranged in a line adjacent to said axes.

16. In a motor comprising a rotor having a shaft, a switch mounted near one end of said rotor, and an actuating device rotatably and slidably mounted on said shaft in operative relation to said switch, centrifugal weights arranged near the other end of said rotor on the opposite sides of said shaft, each weight comprising a member extending transversely to said shaft and end members extending from said transverse member toward the body of said rotor, means for pivotally mounting said end members on said rotor, one end member of each weight having an arm extending from its axis to a point adjacent to said shaft, the two arms being arranged on opposite sides of said shaft, bars extending loosely through the body of said rotor, rigidly connected with said switch actuating device and pivotally connected with the respective arms, and springs connected with the corresponding end members of said weights at points spaced outwardly from their axes and extending across said shaft in lines adjacent to the pivotal axes of said end members and between said axes and the transverse members of said weights.

17. In a motor comprising a rotor having a shaft, a switch mounted near one end of said rotor, and an actuating device rotatably and slidably mounted on said shaft in operative relation to said switch, centrifugal weights arranged near the other end of said rotor on the opposite sides of said shaft, each weight comprising a member extending transversely to said shaft and end members extending from said transverse member toward the body of said rotor, means for pivotally mounting said end members on said rotor, one end member of each weight having an arm extending from its axis to a point adjacent to said shaft, the two arms being arranged on opposite sides of said shaft, bars extending loosely through the body of said rotor, rigidly connected with said switch actuating device and pivotally connected with the respective arms, and springs connected with the corresponding end members of said weights at points spaced outwardly from their axes and extending across said shaft in lines adjacent to the pivotal axes of said end members and between said axes and the transverse members of said weights, and fan blades carried by the transverse members of said weights.

18. In a motor comprising a rotor having a shaft, a switch mounted near one end of said rotor, an actuating device slidably and rotatably mounted on said shaft and in operative relation to said switch, longitudinally movable bars connected with said actuating device, extending loosely through said rotor on opposite sides of said shaft, centrifugal weights arranged near the other end of said rotor on opposite sides of said shaft, means for pivotally connecting said weights with said rotor on axes spaced substantial distances from the axis of said rotor, each weight having a part extending inwardly from its axis to a point adjacent to said shaft and pivotally connected with one of said bars, and spring means to resist the outward movement of said weights.

GEORGE H. LELAND.